(12) United States Patent
Wu et al.

(10) Patent No.: US 11,436,699 B1
(45) Date of Patent: Sep. 6, 2022

(54) PREDICTING ENCODING PARAMETERS FOR CONVEX HULL VIDEO ENCODING

(71) Applicant: Meta Platforms, Inc., Menlo Park, CA (US)

(72) Inventors: Ping-Hao Wu, San Francisco, CA (US); Volodymyr Kondratenko, Foster City, CA (US); Gaurang Chaudhari, Sunnyvale, CA (US); Ioannis Katsavounidis, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/354,685

(22) Filed: Jun. 22, 2021

Related U.S. Application Data

(63) Continuation-in-part of application No. 17/084,031, filed on Oct. 29, 2020.
(Continued)

(51) Int. Cl.
*G06T 3/40* (2006.01)
*G06T 9/00* (2006.01)
*H04N 19/132* (2014.01)
*G06N 20/00* (2019.01)
*H04N 19/146* (2014.01)
*H04N 19/142* (2014.01)
(Continued)

(52) U.S. Cl.
CPC ............... *G06T 3/40* (2013.01); *G06N 20/00* (2019.01); *G06T 9/00* (2013.01); *H04N 19/119* (2014.11); *H04N 19/132* (2014.11); *H04N 19/142* (2014.11); *H04N 19/146* (2014.11); *H04N 19/154* (2014.11)

(58) Field of Classification Search
CPC . G06T 3/40; G06T 9/00; G06N 20/00; H04N 19/119; H04N 19/132; H04N 19/142; H04N 19/146; H04N 19/154
See application file for complete search history.

(56) References Cited

U.S. PATENT DOCUMENTS

2006/0268985 A1 11/2006 Liang et al.
2010/0098173 A1 4/2010 Horiuchi et al.
(Continued)

OTHER PUBLICATIONS

Non-Final Office Action received for U.S. Appl. No. 17/084,031 dated May 11, 2021, 9 pages.

*Primary Examiner* — Tracy Y. Li
(74) *Attorney, Agent, or Firm* — FisherBroyles, LLP

(57) ABSTRACT

The disclosed computer-implemented method may include downsampling and encoding one or more video segments into a plurality of encoded segments with an analysis encoder using a plurality of encoding parameter value sets and decoding and upsampling the plurality of encoded segments to a plurality of decoded segments at an original resolution of the one or more video segments. The method may further include determining, based on analyzing the plurality of decoded segments, an analysis encoding parameter value set for the analysis encoder for the one or more video segments and predicting, based on the analysis encoding parameter value set, a target encoding parameter value set for a target encoder for the one or more video segments. The method may also include encoding the one or more video segments with the target encoder using the target encoding parameter value set. Various other methods, systems, and computer-readable media are also disclosed.

20 Claims, 6 Drawing Sheets

Related U.S. Application Data

(60) Provisional application No. 63/148,828, filed on Feb. 12, 2021, provisional application No. 63/060,315, filed on Aug. 3, 2020.

(51) Int. Cl.
*H04N 19/119* (2014.01)
*H04N 19/154* (2014.01)

(56) References Cited

U.S. PATENT DOCUMENTS

| | | | |
|---|---|---|---|
| 2015/0373328 A1* | 12/2015 | Yenneti | H04N 19/12 375/240.03 |
| 2017/0085872 A1* | 3/2017 | Perron | H04N 21/2402 |
| 2019/0028529 A1 | 1/2019 | Katsavounidis | |
| 2019/0132591 A1* | 5/2019 | Zhang | H04N 19/136 |
| 2019/0379895 A1* | 12/2019 | Katsavounidis | H04N 19/196 |
| 2020/0021847 A1* | 1/2020 | Kim | H04N 19/597 |
| 2020/0304803 A1 | 9/2020 | Damnjanovic et al. | |

* cited by examiner

US 11,436,699 B1

PREDICTING ENCODING PARAMETERS FOR CONVEX HULL VIDEO ENCODING

CROSS REFERENCE TO RELATED APPLICATION

This application is a CIP of U.S. application Ser. No. 17/084,031, filed 29 Oct. 2020, which claims the benefit of U.S. Provisional Application No. 63/060,315, filed 3 Aug. 2020, and further claims the benefit of U.S. Provisional Application No. 63/148,828 filed 12 Feb. 2021, the disclosures of each of which are incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
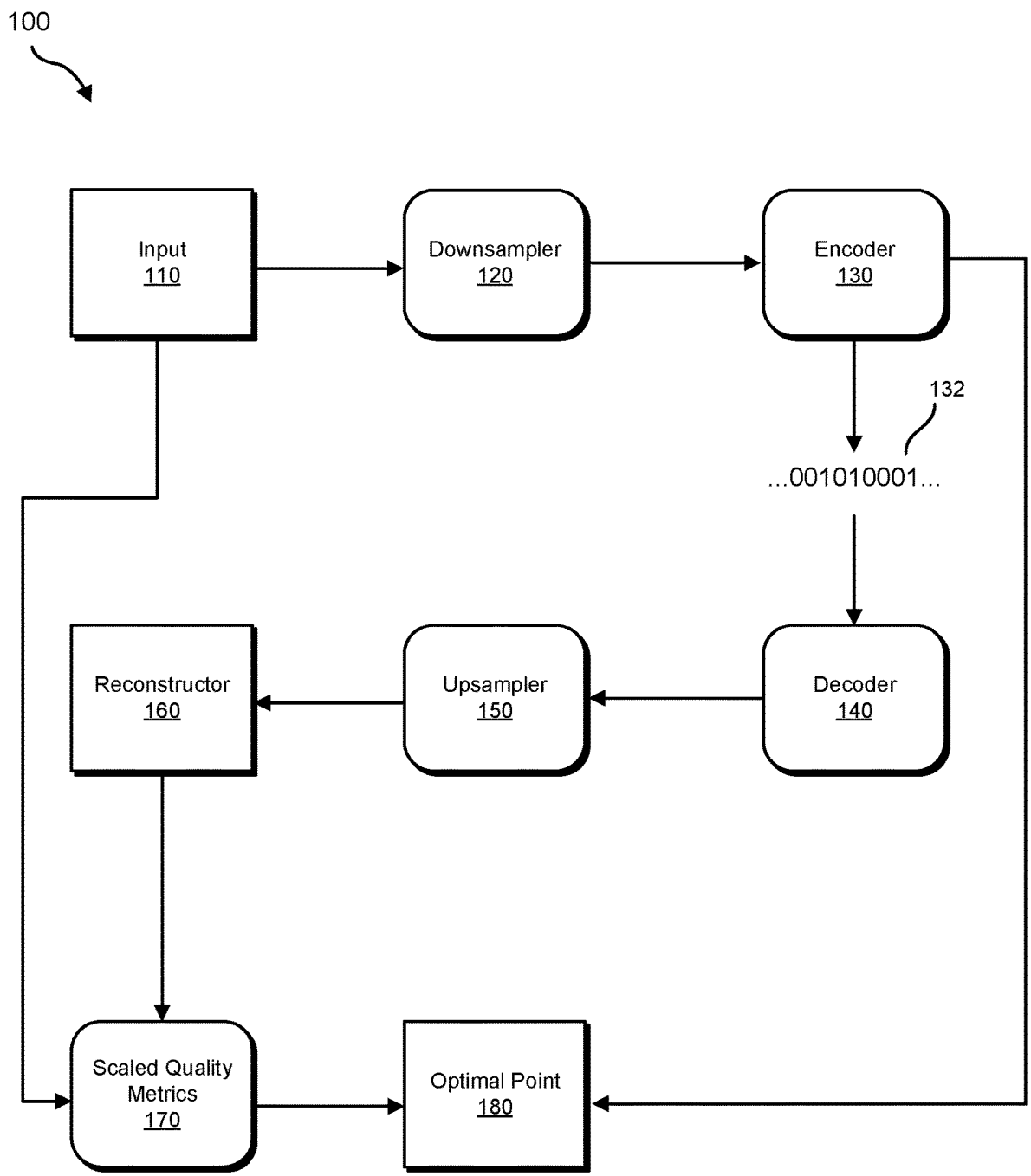
FIG. 1 is a flow diagram of an exemplary process of convex hull video encoding.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Video streaming typically requires a sufficiently fast and stable network connection for uninterrupted streaming or to otherwise minimize buffering. However, due to network conditions and various other factors, the available bandwidth for video streaming may vary. In an attempt to improve video streaming performance, media providers may use adaptive video streaming. Adaptive video streaming may improve video streaming performance by adapting the delivered video based on a user's screen size, network bandwidth, etc. For example, if the user's network speed is reduced during a stream, the media provider may adapt by delivering a lower resolution video so that the user may download at the reduced speed without requiring buffering.

With the increasing use of adaptive video streaming, which requires multiple encoded versions of a source video, compression efficiency is a major consideration. Although advancements in video codecs have improved compression efficiency, such improved compression efficiency may require significant increase in computational complexity. For example, a dynamic optimizer framework may provide optimal encoding of multi-shot video sequences by splitting the video sequences into shots, applying constant-quality encoding within each shot, and combining the encoded shots. However, the encoding complexity may be significantly multiplied because each shot of the video sequence may be encoded multiple times, and higher quality encodings may require longer encoding times. Although various encoding parameters may be adjusted to reduce encoding times, such adjustments may result in suboptimal video quality at certain desired video resolutions.

A more optimal parameter set may be determined through analysis that may require significant computational overhead. Techniques for reducing such overhead may involve analysis using analogous video codecs. However, such techniques may be limited to codecs within a same family and further may not be feasible for newer generations of video codecs.

The present disclosure is generally directed to predicting encoding parameters for convex hull video encoding. As will be explained in greater detail below, embodiments of the present disclosure may encode a video using an analysis encoder, analyze the encoded video to determine optimal encoding parameter values for the analysis encoder, predict optimal encoding parameter values for a target encoder, and encode the video using the target encoder with the predicted encoding parameter values. The system described herein may improve the dynamic optimizer framework by more efficiently determining optimal encoding parameters by using an analysis (e.g., faster) encoder to predict optimal encoding parameters and finally encoding the video using a target (e.g., slower) encoder, applying the determined parameters. The system may improve the functioning of a computing device by determining optimal encoding parameter values that may reduce processing overhead for encoding videos. The system may further improve adaptive streaming technology by achieving faster overall encoding times while maintaining a desired level of video quality.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
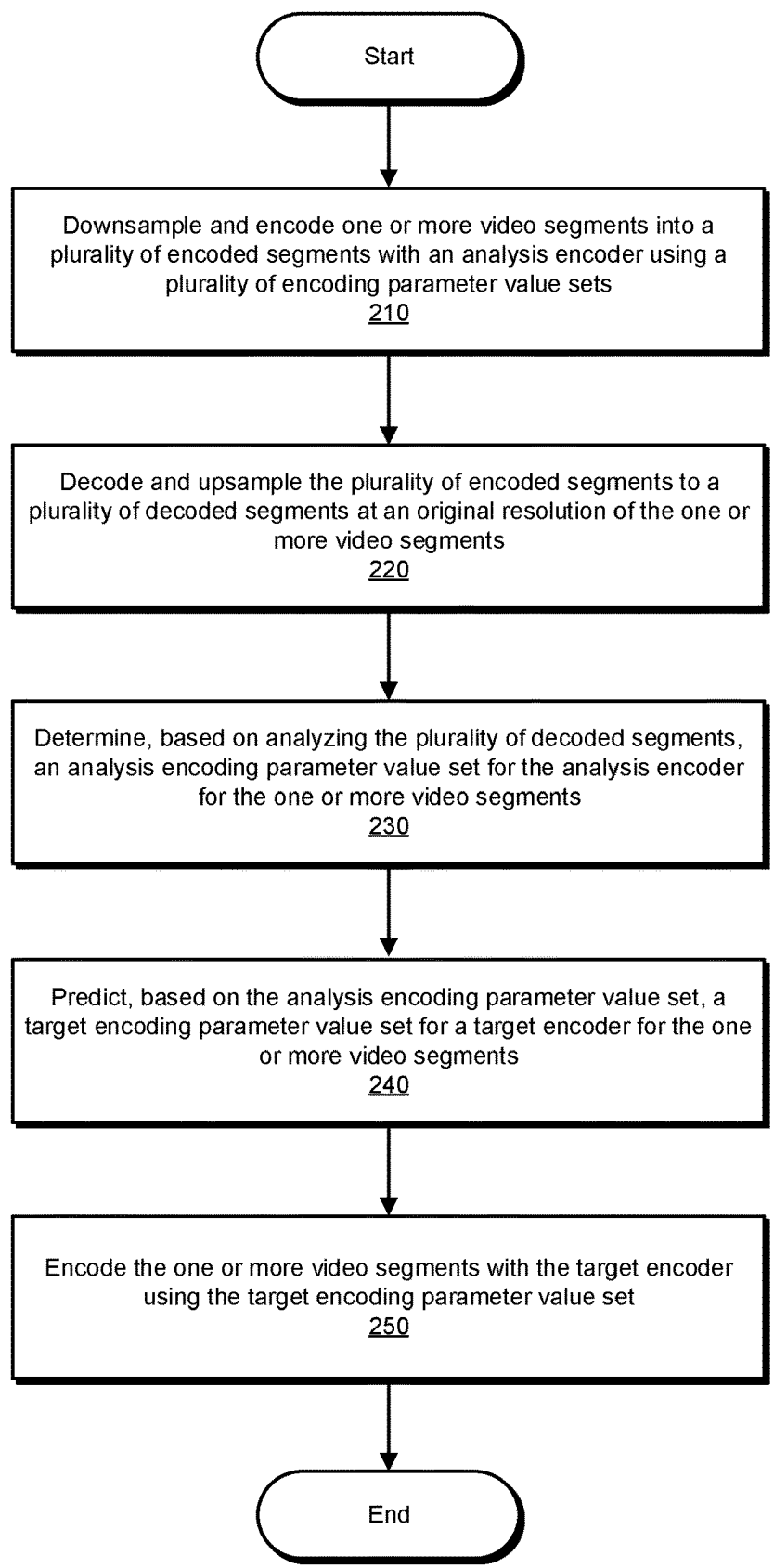
FIG. 2 is a flow diagram of an exemplary method for predicting encoding parameters for convex hull video encoding.
Figure 3:
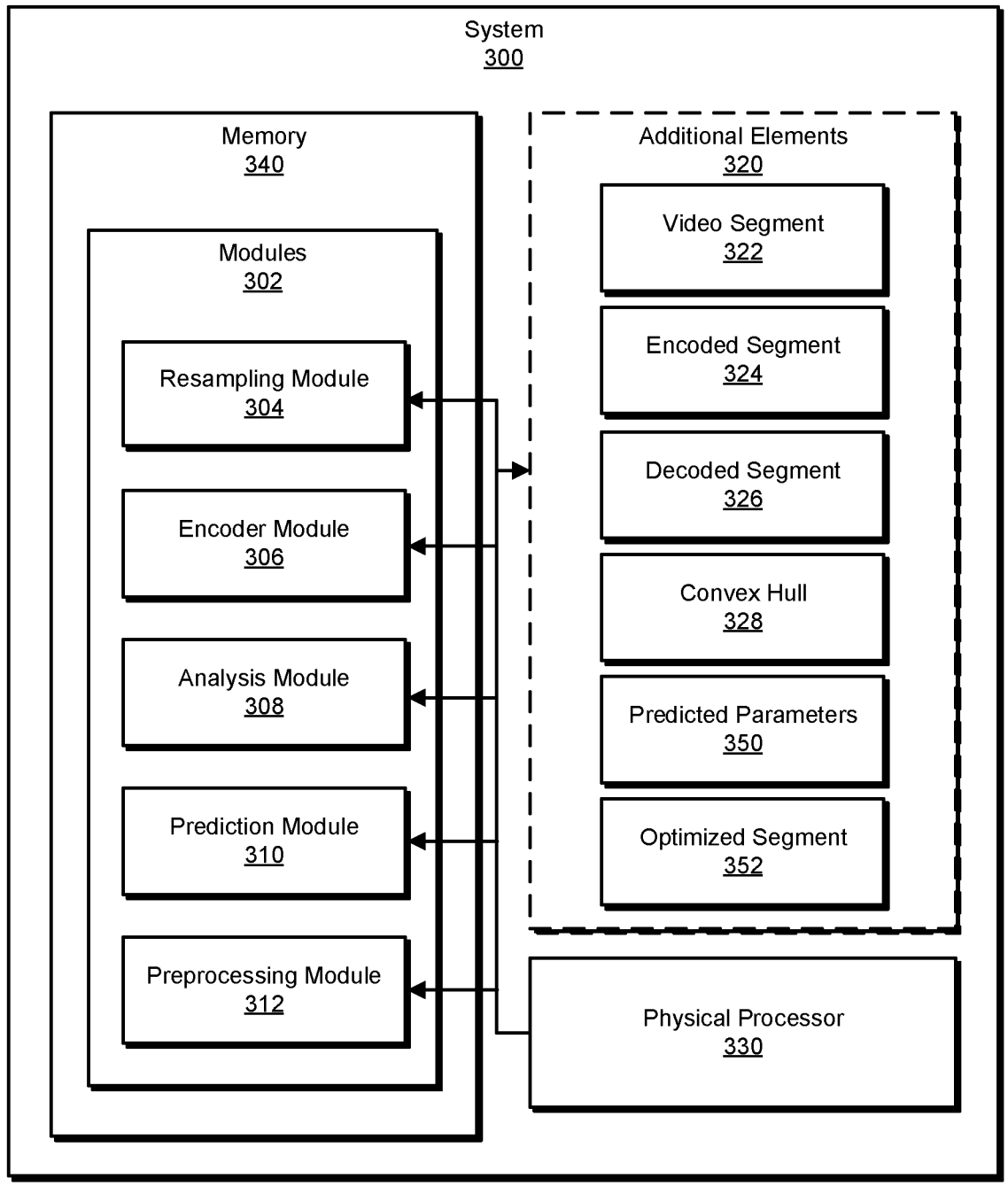
FIG. 3 is a block diagram of an exemplary system for predicting encoding parameters for convex hull video encoding.
Figure 4:
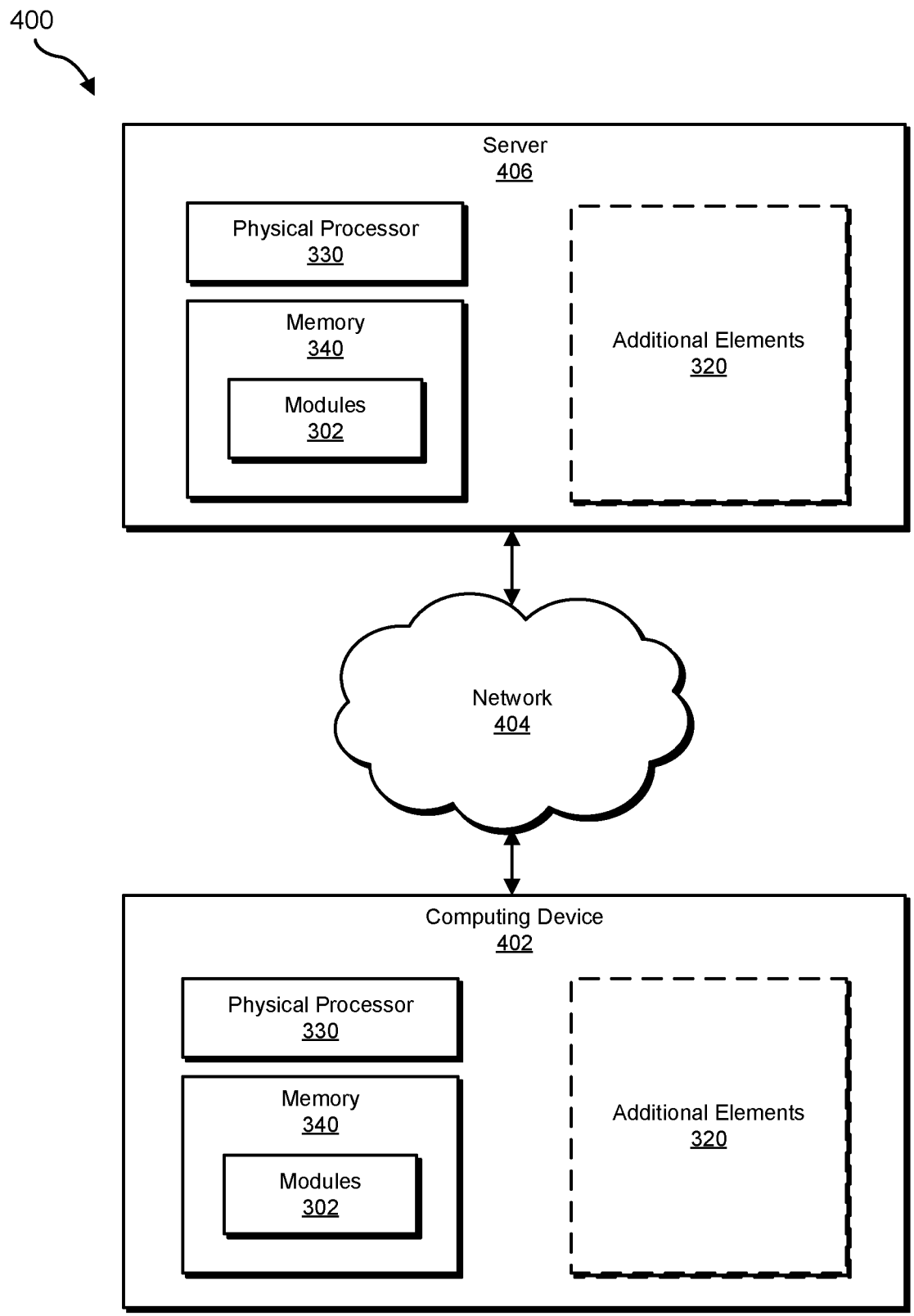
FIG. 4 is a block diagram of an exemplary network for predicting encoding parameters for convex hull video encoding.
Figure 5:
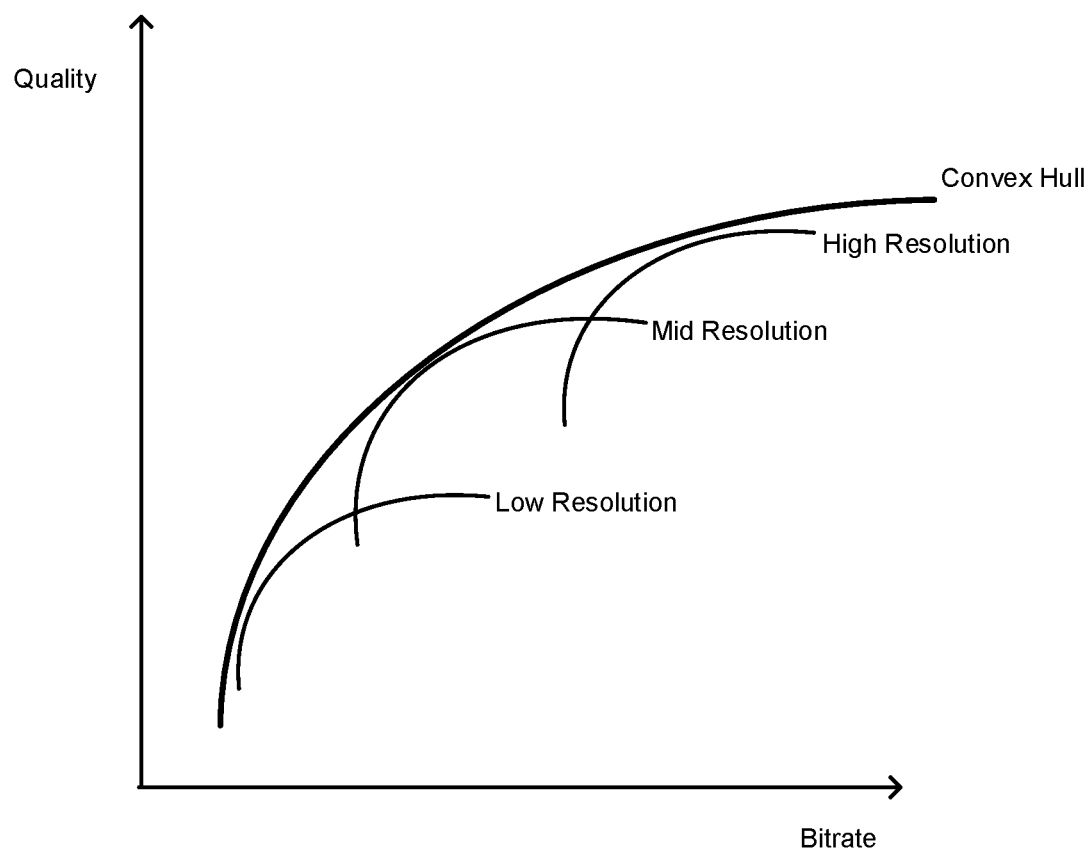
FIG. 5 is a graph depicting a convex hull for video encoding.
Figure 6:
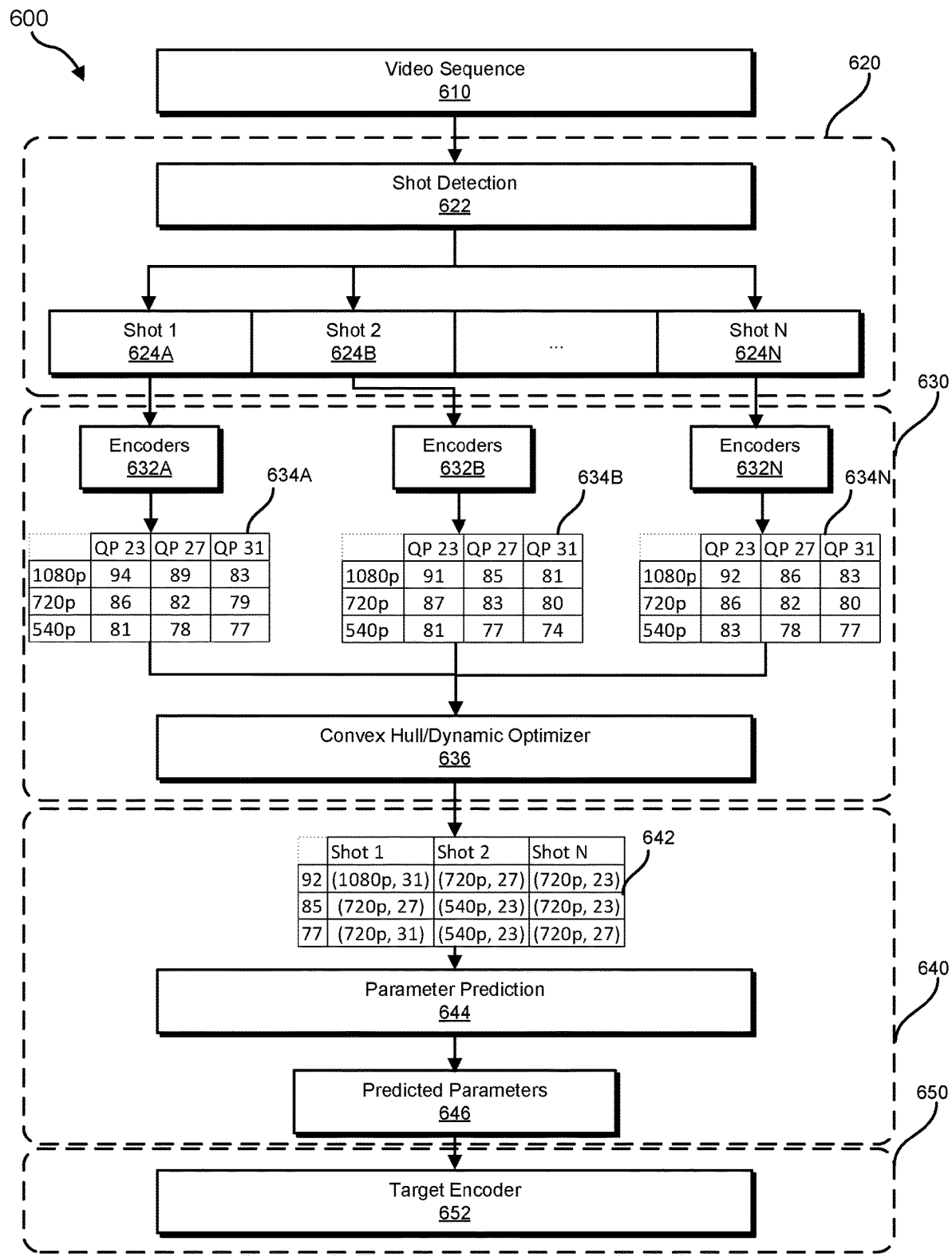
FIG. 6 is a flow diagram of an exemplary process of convex hull video encoding using predicted encoding parameters.

The following will provide, with reference to FIGS. 1-6, detailed descriptions of systems and methods for predicting encoding parameters for convex hull video encoding. FIG. 1 illustrates an exemplary process of convex hull video encoding. FIG. 2 illustrates an exemplary process for predicting encoding parameters. FIG. 3 illustrates an exemplary system for predicting encoding parameters. FIG. 4 illustrates an exemplary network environment. FIG. 5 illustrates a graph depicting a convex hull for video encoding. FIG. 6 illustrates an exemplary process for predicting encoding parameters for convex hull video encoding.

FIG. 1 is a flow diagram of an exemplary computer-implemented process 100 for convex hull video encoding. The steps shown in FIG. 1 may be performed by any suitable computer-executable code and/or computing system, including the system(s) illustrated in FIGS. 3 and 4. In one example, each of the steps shown in FIG. 1 may represent an algorithm whose structure includes and/or is represented by multiple sub-steps, examples of which will be provided in greater detail below.

As illustrated in FIG. 1, at input 110, an original video file may be received. The video file may be preprocessed (e.g., split from a larger video file such as a single shot or segment of the larger video file). As will be explained further below, the original video file may be used for analysis. At downsampler 120, the video file may be downsampled to a resolution lower than that of the original video file. At encoder 130, the downsampled video file may be encoded to an encoded video file 132 using an initial set of encoding parameter values. As will be further explained below, the initial set of encoding parameter values may be used for analysis.

Encoded video file 132 may be decoded at decoder 140, upsampled at upsampler 150 back to the original resolution (e.g., a resolution of the original video file received at input 110), and reconstructed by reconstructor 160 (e.g., reversing the preprocessing done to the original video file received at input 110). The reconstructed video file may be compared with the original video file (e.g., the original video file received at input 110) at scaled quality metrics 170, for example to determine a loss of quality in the reconstructed video file as compared to the original video file in conjunction with the resulting bitrate of the encoded video file 132. Scaled quality metrics 170 may include quality metrics for comparing the reconstructed video file that may have been upscaled by reconstructor 160. At optimal point 180, optimal encoding parameters for encoder 130 may be determined, for example, by finding a convex hull from scaled quality metrics 170.

FIG. 2 is a flow diagram of an exemplary computer-implemented method 200 for predicting encoding parameters for convex hull video encoding. The steps shown in FIG. 2 may be performed by any suitable computer-executable code and/or computing system, including the system(s) illustrated in FIGS. 3 and/or 4. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may downsample and encode one or more video segments into a plurality of encoded segments with an analysis encoder using a plurality of encoding parameter value sets. For example in FIG. 3, a resampling module 304 may downsample a video segment 322 and an encoder module 306 may encode downsampled video segment 322 into an encoded segment 324 with the analysis encoder using an initial set of encoding parameter values.

In some embodiments, the term "downsampling" may refer to a sample-rate reduction. Examples of downsampling include, without limitation, compression, decimation, and other sample-rate reductions.

In some embodiments, the term "resampling" may refer to a sample-rate conversion that may correspond to changing a sampling rate of a discrete signal to a different discrete representation of the underlying continuous signal. Examples of resampling include, without limitations, upsampling, downsampling, upscaling, downscaling, sampling-frequency conversion, decimation, interpolation, etc.

Various systems described herein may perform step 210. FIG. 3 is a block diagram of an example system 300 for predicting encoding parameters. As illustrated in this figure, example system 300 may include one or more modules 302 for performing one or more tasks. As will be explained in greater detail herein, modules 302 may include resampling module 304, encoder module 306, an analysis module 308, a prediction module 310, and a preprocessing module 312. Although illustrated as separate elements, one or more of modules 302 in FIG. 3 may represent portions of a single module or application implemented in hardware and/or software. For example, resampling module 304 may include a scaler that may resize uncompressed video. Encoder module 306 may include a decoder that may accept an uploaded video and output an uncompressed raw video stream. Encoder module 306 may also include an encoder that may output encoded or compressed video. Analysis module 308 may include quality measurement logic for measuring degradation in video quality after encoding. Analysis module 308 and/or prediction module 310 may include machine learning modules for analysis and prediction.

In certain embodiments, one or more of modules 302 in FIG. 3 may represent one or more software applications or programs that, when executed by a computing device, may cause the computing device to perform one or more tasks. For example, and as will be described in greater detail below, one or more of modules 302 may represent modules stored and configured to run on one or more computing devices, such as the devices illustrated in FIG. 4 (e.g., computing device 402 and/or server 406). One or more of modules 302 in FIG. 3 may also represent all or portions of one or more special-purpose computers configured to perform one or more tasks.

As illustrated in FIG. 3, example system 300 may also include one or more memory devices, such as memory 340. Memory 340 generally represents any type or form of volatile or non-volatile storage device or medium capable of storing data and/or computer-readable instructions. In one example, memory 340 may store, load, and/or maintain one or more of modules 302. Examples of memory 340 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 3, example system 300 may also include one or more physical processors, such as physical processor 330. Physical processor 330 generally represents any type or form of hardware-implemented processing unit capable of interpreting and/or executing computer-readable instructions. In one example, physical processor 330 may access and/or modify one or more of modules 302 stored in memory 340. Additionally or alternatively, physical processor 330 may execute one or more of modules 302 to facilitate maintain the mapping system. Examples of physical processor 330 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 3, example system 300 may also include one or more additional elements 320, such as video segment 322, encoded segment 324, a decoded segment 326, a convex hull 328, predicted parameters 350, and an optimized segment 352. Video segment 322, encoded segment 324, decoded segment 326, convex hull 328, predicted parameters 350, and/or optimized segment 352 may be stored on a local storage device, such as memory 340, or may be accessed remotely. Video segment 322 may represent video data, as will be explained further below. Encoded segment 324 may represent an encoded version of video segment 322, as will be explained further below. Decoded segment 326 may represent a decoded version of encoded segment 324, as will be explained further below. Convex hull 328 may represent analysis results of encoding, as will be explained further below. Predicted parameters 350 may represent encoding parameters for a target codec, as will be explained further below. Optimized segment 352 may represent an optimized encoding of video segment 322, as will be explained further below.

Example system 300 in FIG. 3 may be implemented in a variety of ways. For example, all or a portion of example system 300 may represent portions of example network environment 400 in FIG. 4.

FIG. 4 illustrates an exemplary network environment 400 implementing aspects of the present disclosure. The network environment 400 includes computing device 402, a network 404, and server 406. Computing device 402 may be a client device or user device, such as a smartphone, a desktop computer, laptop computer, tablet device, or other computing device. Computing device 402 may include a physical processor 330, which may be one or more processors, and memory 340, which may store data such as one or more of additional elements 320 and/or modules 302.

Server 406 may represent or include one or more servers capable of hosting video data. Server 406 may provide the hosted video data to computing devices such as computing device 402. Server 406 may include a physical processor 330, which may include one or more processors, memory 340, which may store modules 302, and one or more of additional elements 320.

Computing device 402 may be communicatively coupled to server 406 through network 404. Network 404 may represent any type or form of communication network, such as the Internet, and may comprise one or more physical connections, such as LAN, and/or wireless connections, such as WAN.

Returning to FIG. 2, the systems described herein may perform step 210 in a variety of ways. In one example, the encoding parameter value sets may include initial and/or default values that may correspond to an analysis (e.g., fast) encoder. An analysis encoder may be a video encoder selected and/or configured to prioritize fast encoding times, for instance by selecting from older generation video coding standards having reduced computational complexity than current or newer generation video coding standards and/or by configuring the encoder to reduce computational complexity, in order to reduce a time needed for analysis.

In some examples, the analysis encoder may correspond to a video encoder adjusted to reduce computational complexity below a video encoding output threshold. A given encoder may be configured to increase processing speed (e.g., by reducing processing overhead time by reducing computational complexity) at the cost of video encoding output quality (e.g., reduced output quality due to reduced computational complexity). The video encoding output threshold may correspond to a quality threshold for encoded video quality such that satisfying the video encoding output threshold may produce video suitable for human viewing. In other words, the encoder may be configured to speed up processing to the point that videos encoded as such may not be suitable for human viewing. However, because the analysis encoder may not be used for encoding videos for human consumption, the systems and methods described herein may take advantage of encoder configurations that may not satisfy the video encoding output threshold.

In some examples, video segment 322 may have previously been preprocessed by preprocessing module 312 prior to the downsampling. For instance, video segment 322 may be a portion of a larger source video file. In such examples, method 200 may further include dividing a source video into one or more video segments such as video segment 322. For instance, preprocessing module 312 may divide the source video into video segments based on detecting a shot change in the source video. In such examples, each video segment, such as video segment 322, may correspond to a discrete shot from the source video. Preprocessing module 312 may detect shot changes based on, for example, detecting a black or blank screen, a static screen, or other measurable break in the source video. The steps of method 200 may be applied to each of the one or more video segments. Alternatively, video segment 322 may include more than one video segment from the source video.

Preprocessing module 312 may perform other preprocessing steps, as needed. For example, preprocessing module 312 may format or reformat the source video, gather metadata and/or other characteristics and properties of the source video, and otherwise prepare the source video for processing and analysis as described herein.

In some examples, resampling module 304 may downsample video segment 322 into a plurality of downsampled segments based on a plurality of target resolutions. The target resolutions may include desired video resolutions (e.g., 1080p, 720p, 540p) that may correspond to final resolutions used for adaptive video streaming, resolutions useful for analysis, resolutions corresponding to optimal performance, etc. Encoder module 306 may then encode the downsampled segments into the plurality of encoded segments with the analysis encoder using the plurality of encoding parameter value sets. For example, encoded segment 324 may include video segment 322 encoded into the target resolutions using the fast encoder.

At step 220 one or more of the systems described herein may decode and upsample the plurality of encoded segments to a plurality of decoded segments at an original resolution of the one or more video segments. For example, encoder module 306 may decode encoded segment 324 and resampling module 304 may upsample, to an original resolution of video segment 322, the decoded encoded segment 324 into decoded segment 326.

In some embodiments, the term "upsample" may refer to an increase of sample rate corresponding to sampling an underlying signal at a higher rate. Examples of upsampling include, without limitation, expansion, interpolation, and other increases of sample rate.

The systems described herein may perform step 220 in a variety of ways. In one example, encoder module 306 may decode each video segment of encoded segment 324 using a decoder corresponding to the analysis encoder. Each of these decoded segments may be upsampled to the original resolution of video segment 322 such that decoded segment 326 may include one or more video segments corresponding to the various target resolutions. However, the video segments of decoded segment 326 may all share the same resolution as video segment 322.

At step 230 one or more of the systems described herein may determine, based on analyzing the plurality of decoded segments, an analysis encoding parameter value set for the analysis encoder for the one or more video segments. For example, analysis module 308 may analyze decoded segment 326 and based on the analysis, determine analysis encoding parameter values for video segment 322. In some examples, the analysis encoding parameter value set may correspond to an optimized encoding parameter value set for the analysis encoder.

Although decoded segment 326 includes video segments that may share the same resolution as video segment 322, decoded segment 326 may not be an exact duplicate of video segment 322. The encoding and decoding process may not be lossless such that some data or information may have been lost from original video segment 322, and artifacts or other noise may have been introduced.

The systems described herein may perform step 230 in a variety of ways. In one example, analysis module 308 may calculate a quality and a bitrate for each of the plurality of decoded segments. For instance, analysis module 308 may calculate the quality of decoded segment 326 by determining an amount of degradation from video segment 322. Analysis module 308 may determine a convex hull for the one or more video segments.

In some embodiments, the term "convex hull" may refer to the smallest convex set containing a set of points. For example, analysis module 308 may analyze decoded segment 326 on a quality-bitrate plane as seen in graph 500 in FIG. 5. As seen in FIG. 5, for a given resolution, increasing the bitrate may increase quality until reaching diminishing returns or a plateau. However, each resolution may include a bitrate region which outperforms (e.g. exhibits higher quality than) other resolutions at that bitrate region. The convex hull may include these bitrate regions for the various resolutions as illustrated in FIG. 5. Thus, the convex hull may correspond to performance boundaries for bitrates for various resolutions.

Analysis module 308 may determine the optimal analysis encoding parameter value set for video segment 322 based on the convex hull. Analysis module 308 may determine encoding parameter values that may result in video performance on or near the convex hull as illustrated in FIG. 5. For example, analysis module 308 may determine values for a quantization parameter (QP) and a resolution. The QP may correspond to bitrate or other sampling metric and may further correlate to computational complexity. In other examples, the optimal analysis encoding parameter value set may include values for other encoding parameters. In some examples, analysis module 308 may normalize the optimal encoding parameter value set or otherwise prepare the optimal encoding parameter value set for prediction and/or conversion, as described further herein.

Returning to FIG. 2, at step 240 one or more of the systems described herein may predict, based on the analysis encoding parameter value set, a target encoding parameter value set for a target encoder for the one or more video segments. For example, prediction module 310 may predict, based on convex hull 328, predicted parameters 350 for the target encoder.

The systems described herein may perform step 240 in a variety of ways. In one example, the analysis encoder and the target encoder may each correspond to different video codecs. For example, the analysis encoder may be the fast encoder and the target encoder may be a slow encoder. The slow encoder may produce higher quality video than the fast encoder but may involve a higher computational complexity than that of the fast encoder such that the slow encoder may require longer encoding times than the fast encoder. Alternatively, the target encoder may correspond to the same or similar video codec as the analysis encoder that has been adjusted for a higher computational complexity than that of the analysis encoder. Additionally, the analysis encoder and/or the target encoder may correspond to hardware and/or software encoders. For example, the analysis encoder may be a hardware encoder, which may typically be relatively fast compared to software encoders, and the target encoder may be a software encoder, which may be relatively slow compared to hardware encoders.

In yet other examples, the analysis encoder and the target encoder may correspond to video codecs of different coding standards, such as different generations of video codecs. For instance, the analysis encoder may be an older generation of video codec than that of the target encoder. Older generations of video codecs may not be as capable as newer generations of video codecs with respect to video quality and/or resolution. However, older generation codecs may often be less computationally complex such that older generation codecs may perform faster than newer generation codecs.

The analysis encoder may be selected and/or configured to prioritize processing speed whereas the target encoder may be selected and/or configured to prioritize desired video quality/resolution output. Performing analysis (e.g., convex hull analysis or other optimization analysis of encoding parameters) with the analysis encoder may therefore be faster and/or more computationally efficient than performing the analysis with the target encoder. However, the analysis performed with the analysis encoder may not be directly applicable to the target encoder. The optimized encoding parameter values for the analysis encoder (e.g., convex hull 328) may not be usable with the target encoder. For instance, using the same encoding parameter values for the analysis encoder with the target encoder may not produce an expected or desired video output. The encoding parameter values may not scale linearly between the analysis encoder and the target encoder. Alternatively, the encoding parameters may differ across different coding standards such that the encoding parameter values for the analysis encoder may not have directly matching parameters with respect to the target encoder.

As described herein, using the analysis encoder to determine optimal encoding parameters may be more computationally efficient that using the target encoder. However, the results of the analysis with the analysis encoder may not be directly applicable to the target encoder. For example, the quantization parameter ("QP") and resolution values determined with respect to convex hull 328 (e.g., parameter values for the analysis encoder) may not be usable or have a 1-to-1 mapping with parameters for the target encoder. For example, encoders having different encoding standards may use different encoding parameters or utilize encoding parameters differently to produce different behavior. Even for encoders having the same encoding standard, changes in parameter values for the analysis encoder may not produce expected results when applying similar changes to parameter values for the target encoder.

Moreover, converting the QP and resolution values, or other parameter values, may be non-trivial. For instance, linear scaling or other conversion may not be available. Alternatively, the target encoder may not use certain parameters of the analysis encoder or otherwise have directly analogous parameters. As will be explained further below, the systems and methods described herein may require additional processing to determine or predict optimal encoding parameters for the target encoder based on analysis of the analysis encoder.

In some examples, predicting the target encoding parameter value set may further include predicting, using a machine learning model trained to predict performance metrics of the target encoder based on analysis with the analysis encoder, the target encoding parameter value set. For example, prediction module 310 may include or interface with a machine learning model to determine predicted parameters 350 for the target encoder based in part on the analysis for convex hull 328. The machine learning model may accept, as incoming features, one or more of a quantization parameter, a width, a height, a frame count, a bitrate/quality metric, an average luminance, contrast, chroma diversity, amount of motion, spatial information ("SI"), and/or temporal information ("TI") collected from the analysis encoder. In some examples, the machine learning model may be trained to predict encoding parameters for the target encoder as a way of converting encoding parameters of the analysis encoder to those of the target encoder. In other examples, the machine learning model may be trained to determine encoding performance metrics of the target encoder given parameters for the analysis encoder, which may be used for further analysis (e.g., convex hull analysis to determine optimal encoding parameters for the target encoder).

In some examples, predicting the target encoding parameter value set may further include converting, using a parameter map between the analysis encoder and the target encoder, the analysis encoding parameter value set into the target encoding parameter value set. For example, prediction module 310 may use a parameter map to convert optimal encoding parameter values for the analysis encoder (e.g., based on analysis for convex hull 328) to encoding parameter values (e.g., predicted parameters 350) for the target encoder. Predicted parameters 350 determined using the parameter map may produce a similar quality/performance with the target encoder as that with the analysis encoder using the encoding parameters although in some examples, the quality/performance match may be a closest available match rather than a same or similar match (e.g., within a tolerance threshold).

Prediction module 310 may build the parameter map by (a) downsampling and encoding a plurality of test video segments into an analysis plurality of encoded test segments with the analysis encoder using a plurality of test encoding parameter value sets, (b) downsampling and encoding the plurality of test video segments into a target plurality of encoded test segments with the target encoder using the plurality of test encoding parameter value sets, (c) decoding and upsampling the analysis and target pluralities of encoded test segments to a plurality of decoded test segments at an original resolution of the plurality of test video segments, (d) aggregating quality metrics of the plurality of decoded test segments based on parameter value, and (e) building the parameter map by matching the aggregated quality metrics between the analysis encoder and the target encoder.

In some examples, the parameter map may be a static map between two or more encoders (e.g., the analysis encoder and one or more target encoders). In other examples, the parameter map may be a dynamic map. For example, a machine learning model such as the machine learning model described above may build and/or update the parameter map.

Encoding parameters for the analysis encoder, as determined based on convex hull 328, may be converted to the target encoding parameter value set. In some examples, the target encoding parameter value set may include values for a quantization parameter and a resolution, similar to that of the analysis encoder.

Turning back to FIG. 2, at step 250 one or more of the systems described herein may encode the one or more video segments with the target encoder using the target encoding parameter value set. For example, encoder module 306 may encode video segment 322 into optimized segment 352 with the target encoder using the target encoding parameter values.

The systems described herein may perform step 250 in a variety of ways. In one example, if video segment 322 is a portion of a source video (e.g., a detected shot from the source video), the various encoded portions (e.g., optimized segment 352) may be rejoined to recreate the source video.

Although method 200 is described with respect to video segment 322, method 200 or portions thereof may be repeated based on a number of video segments, target resolutions, etc. because each source video may include different requirements. In addition, in certain examples, the optimal encoding parameter value set may be reused for other video segments, used as an additional analysis input, and/or updated as needed.

FIG. 6 shows a flow diagram of a process 600 of an example workflow for predicting encoding parameters for convex hull video encoding. The steps of process 600 may be performed by any system described herein, including system 300 and/or server 406. A video sequence 610 may undergo a preprocessing stage 620, an analysis stage 630, a prediction stage 660, and an encoding stage 650. During preprocessing stage 620, video sequence 610 may undergo shot detection 622 to split video sequence into various shots, such as shot 1 624A, shot 2 624B, . . . shot N 624N.

During analysis stage 630, each shot may undergo downsampling, encoding, decoding, upsampling, and convex hull analysis using one or more analysis encoders. For example, shot 1 624A may be encoded/decoded by encoders 632A to determine convex hull 634A, shot 2 624B may be encoded/decoded by encoders 632B to determine convex hull 634B, and shot N 624N may be encoded/decoded by encoders 632N to determine convex hull 634N. Encoders 632A-N may each be fast encoders and may be the same encoder, or different encoders. As depicted in FIG. 6, the convex hulls 634A-N may indicate performance boundaries associated with a particular resolution (e.g., 1080p) and a particular parameter (e.g., a specific value for QP).

Convex hull/dynamic optimizer 636 may further analyze the convex hulls for each shot to determine optimal parameters 642 for each shot at various target resolutions. Convex hull/dynamic optimizer 636 may not necessarily select absolute maximal values for optimal parameters 642 but rather close estimates. Selecting the absolute maximal values may require a prohibitive compute cost (e.g., requiring multiple slow encodes). Convex hull/dynamic optimizer 636 may determine optimal parameters 642 in a fraction of the compute cost. As depicted in FIG. 6, optimal parameters 642 may include best fit values from convex hulls 634A-N rather than specific values. In some examples, convex hull/dynamic optimizer 636 may perform a deterministic process. For example, given convex hulls 634A-N for all of the shots 624A-N, and a target quality (e.g., 92 as seen in the first row of optimal parameters 642), convex hull/dynamic optimizer 636 may select corresponding parameters (e.g., resolution and QP) for each shot. For other target qualities (e.g., 85 in the second row of optimal parameters 642 and 77 in the third row of optimal parameters 642), convex hull/dynamic optimizer 636 may select appropriate parameters based on convex hulls 634A-N. Thus, optimal parameters 642 may include parameters for one or more target qualities.

During prediction stage 640, optimal parameters 642 may be used by a parameter prediction 644 (which may correspond to prediction module 310) to determine optimal encoding parameters for the target encoder, e.g. predicted parameters 646 (which may correspond to predicted parameters 350). As described herein, parameter prediction 644 may use a machine learning model, a parameter map, and/or other conversion analysis to determine predicted parameters 646.

During encoding stage 650, target encoder 652 may encode the shots using predicted parameters 646. Each shot may be encoded into every target resolution. Using adaptive video streaming, an appropriate resolution for the shots may be delivered to a user.

A hardware video encoder may be significantly more density and power efficient than a software video encoder. However, due to the lower flexibility that the hardware video encoder provides compared to the software video encoder, the compression efficiency of the hardware video encoder may be lower than that of the software video encoder. Reducing the computational complexity of encoding may improve the compression efficiency at the cost of reducing output video quality.

Modern video encoders, including hardware and software encoders, may provide various parameters to enable/disable or otherwise adjust computational complexity. As described herein, the convex hull analysis of a source video may indicate optimal parameter values corresponding to optimal resolution and QP values for each shot of the source video for a given encoder. The systems and methods herein may use these optimal parameter values for a different encoder. Although the optimal parameter values may not correspond to actual optimal parameter values for other encoders, the optimal parameter values may be sufficiently close and advantageously may not require another convex hull analysis that may be computationally cost prohibitive for computationally complex encoders. In other words, performing the convex hull analysis on a less computationally complex encoder may realize significant processing cost reduction compared to the convex hull analysis on a more computationally complex encoder without significant reduction in output video quality.

The encoding parameter selection may include performing shot detection and splitting a video sequence into multiple shots. Each shot may be downsampled and encoded using a faster encoder or faster setting for an encoder, at M different resolutions and N different QP values. Each encode may be decoded and upsampled back to the original resolution of the video sequence for metrics calculation. The convex hull may be determined for each shot. The optimal selection of encoding parameters (e.g., resolution and QP) may be determined for each shot at a desired certain average quality level. The optimal encoding parameters may be used to predict similarly optimal encoding parameter values for a target encoder (e.g., a slower encoder and/or slower encoder setting) to encode the shots. This method may advantageously provide fast selection and prediction of encoding parameters.

In addition, although the example described herein relate to video codecs, the systems and methods described herein may be applicable to other types of encoding, such as audio encoding. By using an analysis encoder to determine potentially optimal encoding parameters, the systems and methods described herein may reduce computational overhead for optimizing encoding. By using predictive techniques, the systems and methods described herein may further take advantage of the fast analysis for use with encoders that may conventionally require significant and/or unfeasible computational overhead.

Example Embodiments

Example 1. A computer-implemented method comprising: (i) downsampling and encoding one or more video segments into a plurality of encoded segments with an analysis encoder using a plurality of encoding parameter value sets; (ii) decoding and upsampling the plurality of encoded segments to a plurality of decoded segments at an original resolution of the one or more video segments; (iii) determining, based on analyzing the plurality of decoded segments, an analysis encoding parameter value set for the analysis encoder for the one or more video segments; (iv) predicting, based on the analysis encoding parameter value set, a target encoding parameter value set for a target encoder for the one or more video segments; and (v) encoding the one or more video segments with the target encoder using the target encoding parameter value set.

Example 2. The method of Example 1, wherein predicting the target encoding parameter value set further comprises predicting, using a machine learning model trained to predict performance metrics of the target encoder based on analysis with the analysis encoder, the target encoding parameter value set.

Example 3. The method of Example 2, wherein incoming features of the machine learning model include at least one of: a quantization parameter (QP), a width, a height, a frame count, a bitrate/quality metric, an average luminance, a contrast, a chroma diversity, an amount of motion, a spatial information, or a temporal information collected from the analysis encoder.

Example 4. The method of any of Examples 1-3, wherein predicting the target encoding parameter value set further comprises converting, using a parameter map between the analysis encoder and the target encoder, the analysis encoding parameter value set into the target encoding parameter value set.

Example 5. The method of Example 4, further comprising building the parameter map by: (a) downsampling and encoding a plurality of test video segments into an analysis plurality of encoded test segments with the analysis encoder using a plurality of test encoding parameter value sets; (b) downsampling and encoding the plurality of test video segments into a target plurality of encoded test segments with the target encoder using the plurality of test encoding parameter value sets; (c) decoding and upsampling the analysis and target pluralities of encoded test segments to a plurality of decoded test segments at an original resolution of the plurality of test video segments; (d) aggregating quality metrics of the plurality of decoded test segments based on parameter value; and (e) building the parameter map by matching the aggregated quality metrics between the analysis encoder and the target encoder.

Example 6. The method of any of Examples 1-5, wherein the analysis encoder and the target encoder each correspond to video codecs of different coding standards.

Example 7. The method of any of Examples 1-6, wherein the target encoder corresponds to a video codec having a higher computational complexity than that of the analysis encoder.

Example 8. The method of any of Examples 1-7, wherein the analysis encoder corresponds to a video codec adjusted to reduce computational complexity below a video encoding output threshold.

Example 9. The method of any of Examples 1-8, wherein the target encoding parameter value set includes values for a quantization parameter (QP) and a resolution.

Example 10. The method of any of Examples 1-9, wherein downsampling and encoding the one or more video segments comprises: downsampling the one or more video segments into a plurality of downsampled segments based on a plurality of target resolutions; and encoding the plurality of downsampled segments into the plurality of encoded segments with the analysis encoder using the plurality of encoding parameter value sets.

Example 11. The method of any of Examples 1-10, wherein analyzing the plurality of decoded segments comprises: calculating a quality and a bitrate for each of the plurality of decoded segments; and determining, by analyzing the plurality of decoded segments on a quality-bitrate plane, a convex hull for the one or more video segments, wherein the convex hull corresponds to performance boundaries for bitrates and the target encoding parameter value set for the one or more video segments is determined based on the convex hull.

Example 12. The method of any of Examples 1-11, further comprising dividing a source video into the one or more video segments based on detecting a shot change in the source video.

Example 13. A system comprising: at least one physical processor; physical memory comprising computer-executable instructions that, when executed by the physical processor, cause the physical processor to: (i) downsample and encode one or more video segments into a plurality of encoded segments with an analysis encoder using a plurality of encoding parameter value sets; (ii) decode and upsample the plurality of encoded segments to a plurality of decoded segments at an original resolution of the one or more video segments; (iii) determine, based on analyzing the plurality of decoded segments, an analysis encoding parameter value set for the analysis encoder for the one or more video segments; (iv) predict, based on the analysis encoding parameter value set, a target encoding parameter value set for a target encoder for the one or more video segments; and (v) encode the one or more video segments with the target encoder using the target encoding parameter value set.

Example 14. The system of Example 13, wherein: the instructions for predicting the target encoding parameter value set further comprises instructions for predicting, using a machine learning model trained to predict performance metrics of the target encoder based on analysis with the analysis encoder, the target encoding parameter value set; and incoming features of the machine learning model include at least one of: a quantization parameter (QP), a width, a height, a frame count, a bitrate/quality metric, an average luminance, a contrast, a chroma diversity, an amount of motion, a spatial information, or a temporal information collected from the analysis encoder.

Example 15. The system of any of Examples 13-14, wherein the instructions for predicting the target encoding parameter value set further comprises instructions for converting, using a parameter map between the analysis encoder and the target encoder, the analysis encoding parameter value set into the target encoding parameter value set.

Example 16. The system of Example 15, further comprising instructions for building the parameter map by: (a) downsampling and encoding a plurality of test video segments into an analysis plurality of encoded test segments with the analysis encoder using a plurality of test encoding parameter value sets; (b) downsampling and encoding the plurality of test video segments into a target plurality of encoded test segments with the target encoder using the plurality of test encoding parameter value sets; (c) decoding and upsampling the analysis and target pluralities of encoded test segments to a plurality of decoded test segments at an original resolution of the plurality of test video segments; (d) aggregating quality metrics of the plurality of decoded test segments based on parameter value; and (e) building the parameter map by matching the aggregated quality metrics between the analysis encoder and the target encoder.

Example 17. A non-transitory computer-readable medium comprising one or more computer-executable instructions that, when executed by at least one processor of a computing device, cause the computing device to: (i) downsample and encode one or more video segments into a plurality of encoded segments with an analysis encoder using a plurality of encoding parameter value sets; (ii) decode and upsample the plurality of encoded segments to a plurality of decoded segments at an original resolution of the one or more video segments; (iii) determine, based on analyzing the plurality of decoded segments, an analysis encoding parameter value set for the analysis encoder for the one or more video segments; (iv) predict, based on the analysis encoding parameter value set, a target encoding parameter value set for a target encoder for the one or more video segments; and (v) encode the one or more video segments with the target encoder using the target encoding parameter value set.

Example 18. The non-transitory computer-readable medium of Example 17, wherein: the instructions for predicting the target encoding parameter value set further comprises instructions for predicting, using a machine learning model trained to predict performance metrics of the target encoder based on analysis with the analysis encoder, the target encoding parameter value set; and incoming features of the machine learning model include at least one of: a quantization parameter (QP), a width, a height, a frame count, a bitrate/quality metric, an average luminance, a contrast, a chroma diversity, an amount of motion, a spatial information, or a temporal information collected from the analysis encoder.

Example 19. The non-transitory computer-readable medium of any of Examples 17-18, wherein the instructions for predicting the target encoding parameter value set further comprises instructions for converting, using a parameter map between the analysis encoder and the target encoder, the analysis encoding parameter value set into the target encoding parameter value set.

Example 20. The non-transitory computer-readable medium of Example 19, further comprising instructions for building the parameter map by: (a) downsampling and encoding a plurality of test video segments into an analysis plurality of encoded test segments with the analysis encoder using a plurality of test encoding parameter value sets; (b) downsampling and encoding the plurality of test video segments into a target plurality of encoded test segments with the target encoder using the plurality of test encoding parameter value sets; (c) decoding and upsampling the analysis and target pluralities of encoded test segments to a plurality of decoded test segments at an original resolution of the plurality of test video segments; (d) aggregating quality metrics of the plurality of decoded test segments based on parameter value; and (e) building the parameter map by matching the aggregated quality metrics between the analysis encoder and the target encoder.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive video data to be transformed, transform the video data, output a result of the transformation to determine a convex hull, use the result of the transformation to predict optimal encoding parameters, and store the result of the transformation to encode the video data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    downsampling and encoding one or more video segments into a plurality of encoded segments with an analysis encoder using a plurality of encoding parameter value sets;
    decoding and upsampling the plurality of encoded segments to a plurality of decoded segments at an original resolution of the one or more video segments;
    determining, based on analyzing the plurality of decoded segments, an analysis encoding parameter value set for the analysis encoder for the one or more video segments, wherein the analysis encoding parameter value set is incompatible with a target encoder;
    predicting, based on the analysis encoding parameter value set, a target encoding parameter value set for the target encoder for the one or more video segments; and
    encoding the one or more video segments with the target encoder using the target encoding parameter value set.

2. The method of claim 1, wherein predicting the target encoding parameter value set further comprises predicting, using a machine learning model trained to predict performance metrics of the target encoder based on analysis with the analysis encoder, the target encoding parameter value set.

3. The method of claim 2, wherein incoming features of the machine learning model include at least one of: a quantization parameter (QP), a width, a height, a frame count, a bitrate/quality metric, an average luminance, a contrast, a chroma diversity, an amount of motion, a spatial information, or a temporal information collected from the analysis encoder.

4. The method of claim 1, wherein predicting the target encoding parameter value set further comprises converting, using a parameter map between the analysis encoder and the target encoder, the analysis encoding parameter value set into the target encoding parameter value set.

5. The method of claim 4, further comprising building the parameter map by:
  downsampling and encoding a plurality of test video segments into an analysis plurality of encoded test segments with the analysis encoder using a plurality of test encoding parameter value sets;
  downsampling and encoding the plurality of test video segments into a target plurality of encoded test segments with the target encoder using the plurality of test encoding parameter value sets;
  decoding and upsampling the analysis and target pluralities of encoded test segments to a plurality of decoded test segments at an original resolution of the plurality of test video segments;
  aggregating quality metrics of the plurality of decoded test segments based on parameter value; and
  building the parameter map by matching the aggregated quality metrics between the analysis encoder and the target encoder.

6. The method of claim 1, wherein the analysis encoder and the target encoder each correspond to video codecs of different coding standards.

7. The method of claim 1, wherein the target encoder corresponds to a video codec having a higher computational complexity than that of the analysis encoder.

8. The method of claim 1, wherein the analysis encoder corresponds to a video codec adjusted to reduce computational complexity below a video encoding output threshold.

9. The method of claim 1, wherein the target encoding parameter value set includes values for a quantization parameter (QP) and a resolution.

10. The method of claim 1, wherein downsampling and encoding the one or more video segments comprises:
  downsampling the one or more video segments into a plurality of downsampled segments based on a plurality of target resolutions; and
  encoding the plurality of downsampled segments into the plurality of encoded segments with the analysis encoder using the plurality of encoding parameter value sets.

11. The method of claim 1, wherein analyzing the plurality of decoded segments comprises:
  calculating a quality and a bitrate for each of the plurality of decoded segments; and
  determining, by analyzing the plurality of decoded segments on a quality-bitrate plane, a convex hull for the one or more video segments, wherein the convex hull corresponds to performance boundaries for bitrates and the target encoding parameter value set for the one or more video segments is determined based on the convex hull.

12. The method of claim 1, further comprising dividing a source video into the one or more video segments based on detecting a shot change in the source video.

13. A system comprising:
  at least one physical processor;
  physical memory comprising computer-executable instructions that, when executed by the physical processor, cause the physical processor to:
    downsample and encode one or more video segments into a plurality of encoded segments with an analysis encoder using a plurality of encoding parameter value sets;
    decode and upsample the plurality of encoded segments to a plurality of decoded segments at an original resolution of the one or more video segments;
    determine, based on analyzing the plurality of decoded segments, an analysis encoding parameter value set for the analysis encoder for the one or more video segments, wherein the analysis encoding parameter value set is incompatible with a target encoder;
    predict, based on the analysis encoding parameter value set, a target encoding parameter value set for the target encoder for the one or more video segments; and
    encode the one or more video segments with the target encoder using the target encoding parameter value set.

14. The system of claim 13, wherein:
  the instructions for predicting the target encoding parameter value set further comprises instructions for predicting, using a machine learning model trained to predict performance metrics of the target encoder based on analysis with the analysis encoder, the target encoding parameter value set; and
  incoming features of the machine learning model include at least one of: a quantization parameter (QP), a width, a height, a frame count, a bitrate/quality metric, an average luminance, a contrast, a chroma diversity, an amount of motion, a spatial information, or a temporal information collected from the analysis encoder.

15. The system of claim 13, wherein the instructions for predicting the target encoding parameter value set further comprises instructions for converting, using a parameter map between the analysis encoder and the target encoder, the analysis encoding parameter value set into the target encoding parameter value set.

16. The system of claim 15, further comprising instructions for building the parameter map by:
  downsampling and encoding a plurality of test video segments into an analysis plurality of encoded test segments with the analysis encoder using a plurality of test encoding parameter value sets;
  downsampling and encoding the plurality of test video segments into a target plurality of encoded test segments with the target encoder using the plurality of test encoding parameter value sets;
  decoding and upsampling the analysis and target pluralities of encoded test segments to a plurality of decoded test segments at an original resolution of the plurality of test video segments;
  aggregating quality metrics of the plurality of decoded test segments based on parameter value; and
  building the parameter map by matching the aggregated quality metrics between the analysis encoder and the target encoder.

17. A non-transitory computer-readable medium comprising one or more computer-executable instructions that, when executed by at least one processor of a computing device, cause the computing device to:
  downsample and encode one or more video segments into a plurality of encoded segments with an analysis encoder using a plurality of encoding parameter value sets;
  decode and upsample the plurality of encoded segments to a plurality of decoded segments at an original resolution of the one or more video segments;
  determine, based on analyzing the plurality of decoded segments, an analysis encoding parameter value set for the analysis encoder for the one or more video segments, wherein the analysis encoding parameter value set is incompatible with a target encoder;

predict, based on the analysis encoding parameter value set, a target encoding parameter value set for the target encoder for the one or more video segments; and encode the one or more video segments with the target encoder using the target encoding parameter value set.

18. The non-transitory computer-readable medium of claim 17, wherein:

the instructions for predicting the target encoding parameter value set further comprises instructions for predicting, using a machine learning model trained to predict performance metrics of the target encoder based on analysis with the analysis encoder, the target encoding parameter value set; and incoming features of the machine learning model include at least one of: a quantization parameter (QP), a width, a height, a frame count, a bitrate/quality metric, an average luminance, a contrast, a chroma diversity, an amount of motion, a spatial information, or a temporal information collected from the analysis encoder.

19. The non-transitory computer-readable medium of claim 17, wherein the instructions for predicting the target encoding parameter value set further comprises instructions for converting, using a parameter map between the analysis encoder and the target encoder, the analysis encoding parameter value set into the target encoding parameter value set.

20. The non-transitory computer-readable medium of claim 19, further comprising instructions for building the parameter map by:

downsampling and encoding a plurality of test video segments into an analysis plurality of encoded test segments with the analysis encoder using a plurality of test encoding parameter value sets;

downsampling and encoding the plurality of test video segments into a target plurality of encoded test segments with the target encoder using the plurality of test encoding parameter value sets;

decoding and upsampling the analysis and target pluralities of encoded test segments to a plurality of decoded test segments at an original resolution of the plurality of test video segments;

aggregating quality metrics of the plurality of decoded test segments based on parameter value; and building the parameter map by matching the aggregated quality metrics between the analysis encoder and the target encoder.

* * * * *